United States Patent [19]

Baumann et al.

[11] Patent Number: 5,133,176
[45] Date of Patent: Jul. 28, 1992

[54] MULTI-BLADED MULCHING MOWER

[75] Inventors: James R. Baumann, Saint Louis Park; Richard A. Thorud, Bloomington; Raymond H. Smith, Jr., Apple Valley, all of

[73] Assignee: The Toro Company, Minneapolis, Minn.

[21] Appl. No.: 670,795

[22] Filed: Mar. 18, 1991

Related U.S. Application Data

[63] Continuation-in-part of Ser. No. 559,963, Jul. 27, 1990, abandoned.

[51] Int. Cl.⁵ .............................. A01D 34/84
[52] U.S. Cl. .................... 56/17.4; 56/320.1
[58] Field of Search ............ 56/10.1, 14.5, 16.7, 56/17.2, 17.4, 289, DIG. 9, DIG. 17

[56] References Cited

U.S. PATENT DOCUMENTS

| | | |
|---|---|---|
| 2,815,634 | 12/1957 | Bush . |
| 2,836,024 | 5/1958 | Davis . |
| 2,991,612 | 7/1961 | Holmes . |
| 3,234,719 | 2/1966 | Rank . |
| 3,245,209 | 4/1966 | Marek . |
| 3,339,353 | 9/1967 | Schreyer . |
| 3,483,684 | 12/1969 | Price . |
| 3,508,385 | 4/1970 | Carlson . |
| 3,543,490 | 12/1970 | Erickson . |
| 4,099,366 | 7/1978 | Peterson . |
| 4,189,903 | 2/1980 | Jackson et al. . |
| 4,205,512 | 6/1980 | Thorud . |
| 4,226,074 | 7/1980 | Mullet et al. . |
| 4,364,221 | 12/1982 | Wixom . |
| 4,453,374 | 6/1984 | Kuhn ........................ 56/17.4 X |
| 4,679,383 | 7/1987 | Ouintel ...................... 56/17.4 X |
| 4,736,573 | 4/1988 | Seck .......................... 56/17.4 X |

Primary Examiner—Thuy M. Bui
Attorney, Agent, or Firm—James W. Miller

[57] ABSTRACT

A multi-bladed mulching mower comprises a cutting deck beneath which a plurality of cutting blades are carried. The cutting blades are shrouded so that each cutting blade is confined within a generally circular cutting chamber. Kicker members are located in each of the cutting chambers to help deflect cut grass particles downwardly into the uncut grass. Thus, a mower is provided suited for mowing relatively large areas which is also capable of dispensing the cut grass clippings into the cut grass path to serve as mulch.

36 Claims, 4 Drawing Sheets

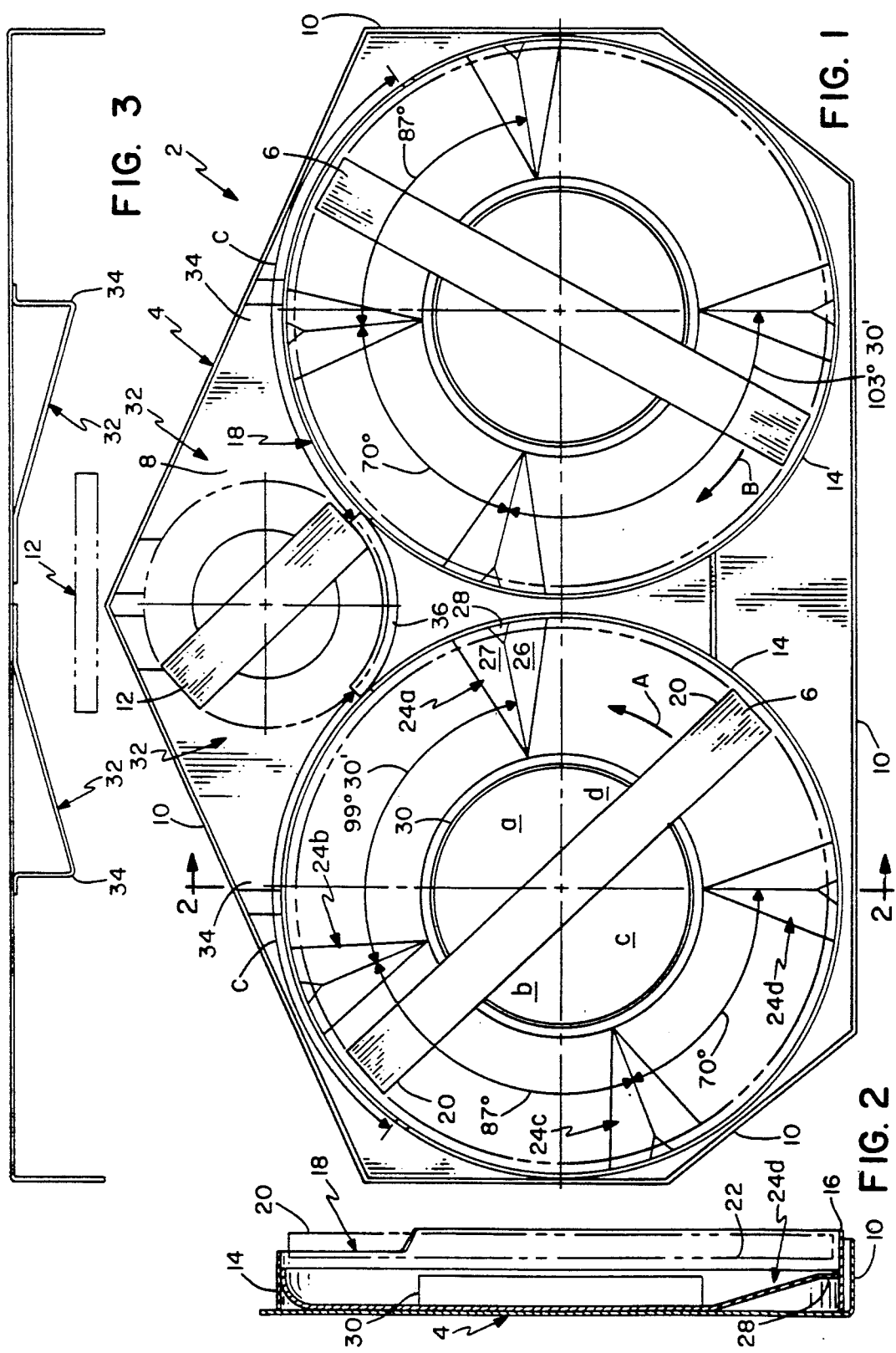

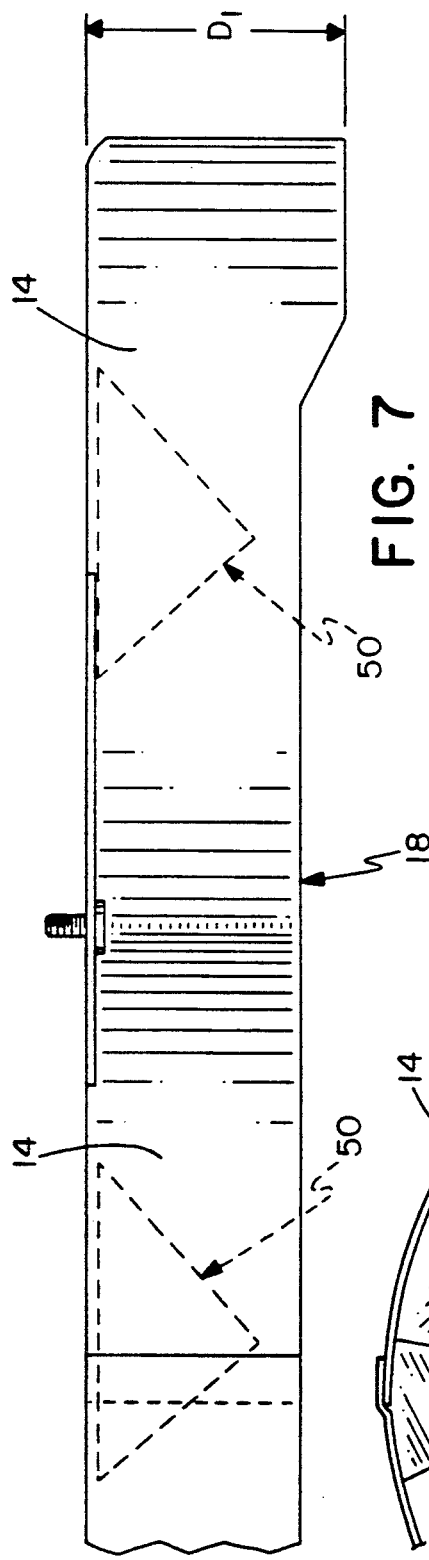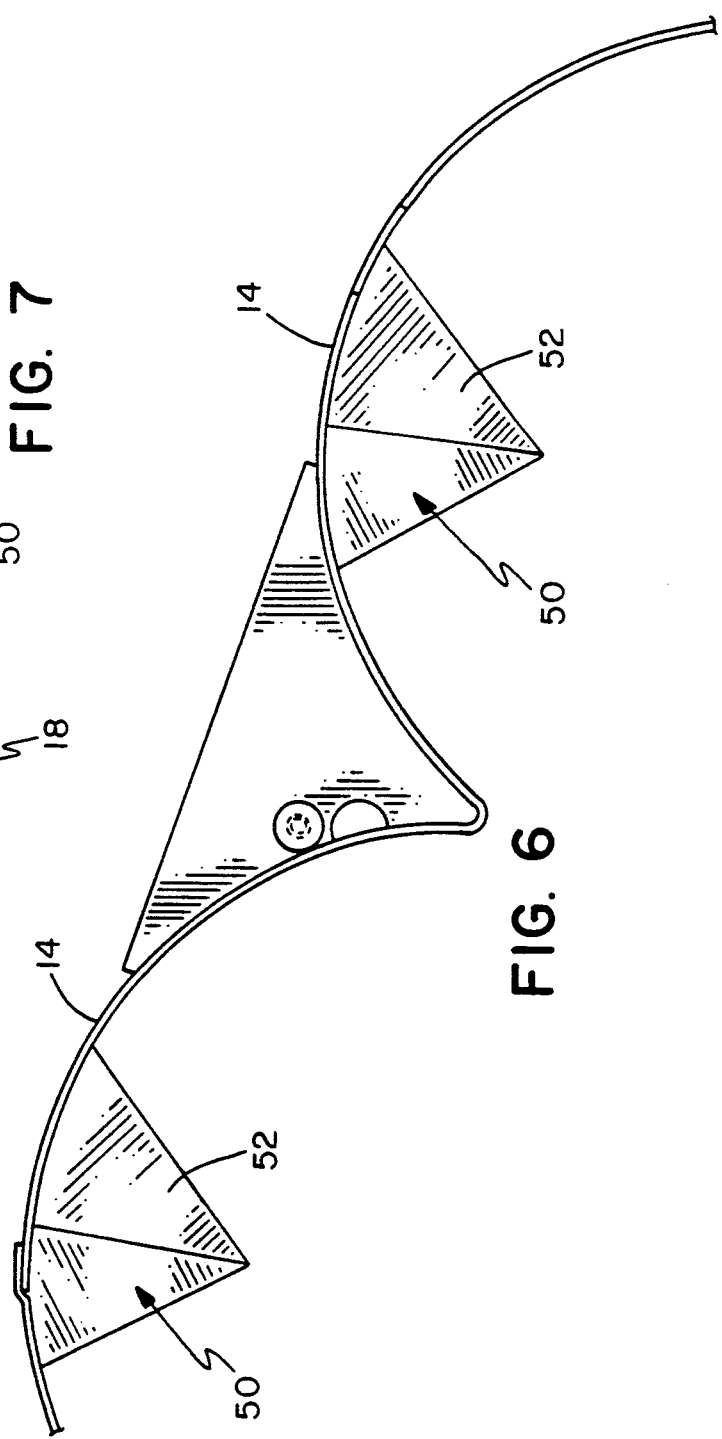

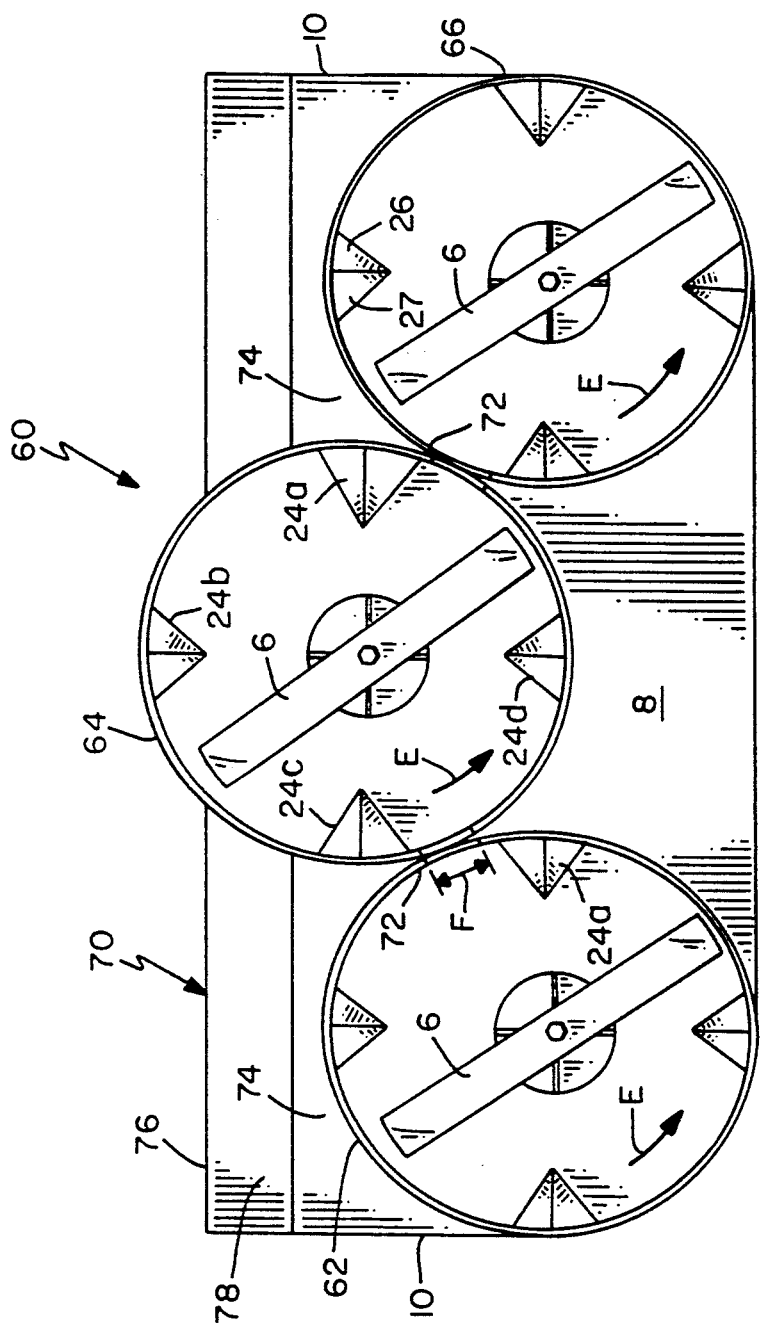
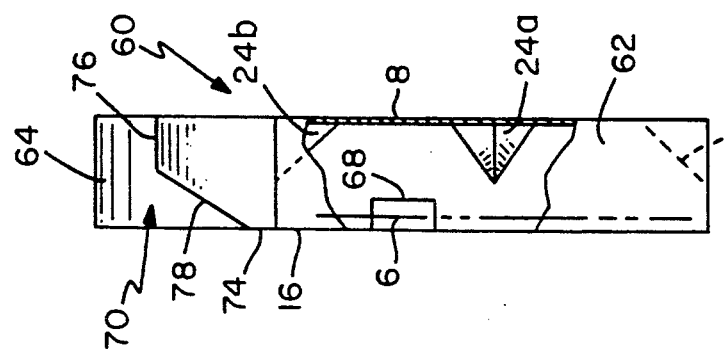
FIG. 8
FIG. 9

5,133,176

MULTI-BLADED MULCHING MOWER

CROSS REFERENCE TO RELATED APPLICATION

This is a continuation-in-part of Application Ser. No. 07/559,963 filed Jul. 27, 1990, now abandoned.

TECHNICAL FIELD

The present invention relates to a mowing apparatus having a plurality of cutting blades contained within a cutting deck. More particularly, the present invention relates to such a mower which is able to mulch or recycle the grass clippings into the cut grass path.

BACKGROUND OF THE INVENTION

Walk behind lawn mowers are known having a housing supported for movement over the ground by a plurality of wheels. A cutting blade rotates horizontally in a cutting chamber located within the housing. The user pushes or guides the mower by holding an upwardly extending handle assembly connected to the mower housing. The cutting blade cuts grass as the mower travels over the ground. The grass clippings are usually discharged through a side or rear discharge opening provided in the mower housing.

Mulching mowers are known in which the usual discharge opening from the housing is either blocked or is absent in the first place. The purpose of such mulching mowers is to use the grass clippings as mulch, i.e. to drive the grass clippings back downwardly into the cut grass path where they can decompose and serve as fertilizer. Some mulching mowers have used deflectors or kicker members contained on the underside of the mower housing in the cutting chamber. These deflectors were shaped to assist in the downward movement and disposal of the grass clippings. U.S. Pat. No. 4,205,512 to Thorud discloses a prior art mulching mower of this type.

Mulching mowers of the type known previously were not well suited for cutting large areas of grass. Such mowers were limited in width and used only a single cutting blade. For example, most mowers of this type did not exceed 21 inches in width. Thus, it would be too time consuming and labor intensive to use this type of mower for cutting large areas of grass such as those found on golf courses, parks, and the like.

Mowing machines are known which are specifically designed for cutting relatively large areas of the type just mentioned. These machines include a cutting deck attached to a traction unit that is normally self-propelled for carrying the cutting deck over the ground. The cutting deck is quite wide and includes more than one blade arranged across the width of the cutting deck to provide a wide swath of cut grass for each pass of the mowing machine. However, none of the previously known mowers of this type were effective mulchers.

SUMMARY OF THE INVENTION

Accordingly, it is one aspect of the present invention to provide a multi-bladed mulching mower that may be used to cut relatively large areas of grass while effectively disposing of the grass clippings in the cut grass path.

A mower according to this invention comprises a cutting deck which may be operatively connected to a traction unit for moving the cutting deck over the ground. A plurality of substantially horizontal cutting blades are rotatably carried beneath the cutting deck. The blades are further contained within shroud means. The shroud means extends downwardly from the cutting deck and is shaped to confine the circulation of the grass clippings to areas of the cutting deck adjacent the cutting blades. Deflecting means are mounted above the cutting blades and within the shroud means to deflect grass clippings downwardly into the path of the blade for recutting and eventual disposal in the cut grass path.

BRIEF DESCRIPTION OF THE DRAWINGS

The present invention will be described in more detail in the following Detailed Description, taken in conjunction with the following drawings, in which like reference numerals refer to like elements throughout.

FIG. 1 is a bottom plan view of an improved multi-bladed cutting deck according to the present invention, particularly illustrating the shroud means and grass deflecting means used for mulching purposes;

FIG. 2 is a cross-sectional view of the cutting deck shown in FIG. 1 taken along line 2—2 in FIG. 1;

FIG. 3 is a front elevational view of the cutting deck shown in FIG. 1, with the front peripheral wall of the cutting deck being removed to illustrate the ramps used in conjunction with the front trimming blade for conducting cut grass particles from the front trimming blade into the shroud means enclosing the main cutting blades of the deck;

FIG. 6 is a bottom plan view of a portion of the shroud means for the cutting deck shown in FIG. 5, particularly illustrating the configuration of the grass deflecting means used on that cutting deck;

FIG. 7 is a front elevational view of the shroud means shown in FIG. 6, particularly illustrating a change in height of the shroud means at the side thereof;

FIG. 8 is a bottom plan view of a third embodiment of a cutting deck according to this invention, particularly illustrating another arrangement of cutting blades, shroud means, and grass deflecting means used for mulching; and FIG. 9 is a side elevational view of the cutting deck shown in FIG. 8 with a portion thereof being broken away, particularly illustrating the front grass deflecting ledge for eliminating streaks between the adjacent cutting chambers.

DETAILED DESCRIPTION

Figure 4:
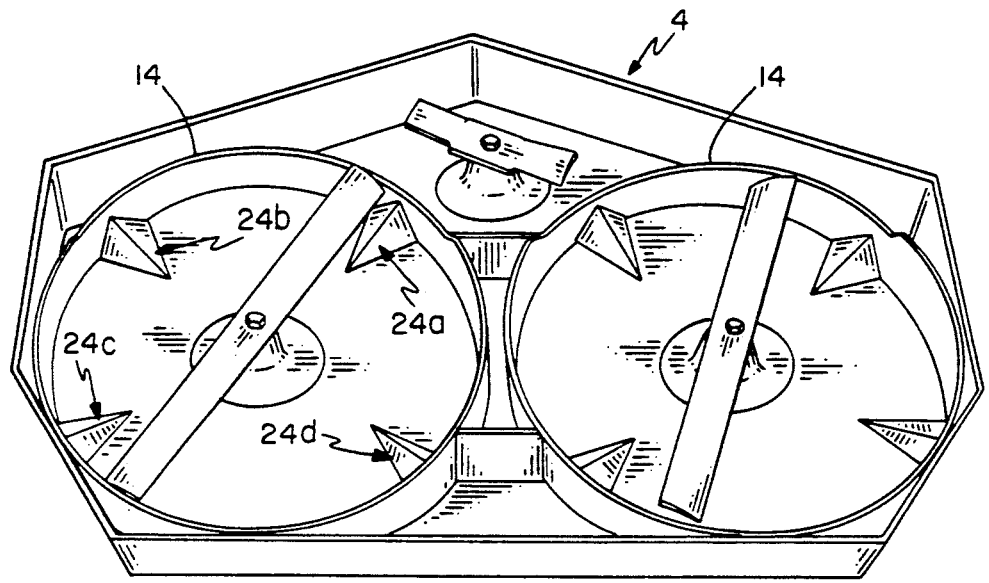
FIG. 4 is a bottom plan view of another cutting deck similar to that shown in FIG. 1, but illustrating a different orientation for the grass deflecting means used within the shroud means.

The present invention relates to a multi-bladed lawn mower generally illustrated in FIGS. 1-3 as 2. Mower 2 includes a cutting deck 4 of the type having a relatively large cutting width which is connected in any suitable manner to a traction unit (not shown). Thus, cutting deck 4 could comprise a deck of the type suspended or otherwise carried on a riding lawn mower having a tractor type vehicle as the traction unit. Alternatively, cutting deck 4 could be suspended or otherwise carried on a self-propelled, walk behind lawn mower of the type known today as wide area mowers or WAM's. These mowers, while not of the riding type, do include a traction means for propelling the mower frame, and hence the cutting deck, over the ground. In either event, however, cutting deck 4 mounts a plurality of side-by-side cutting blades 6 for cutting a relatively wide swath.

Referring particularly to a first embodiment of the present invention as shown in FIGS. 1-3, cutting deck 4 comprises a relatively planar top wall 8 which is bounded along its peripheral edges by downwardly extending side walls 10. Cutting deck 4 includes two main cutting blades 6 arranged side by side beneath cutting deck 4 as shown in FIG. 1. Cutting blades 6 do not overlap, are not staggered relative to one another, and rotate counter to one another as indicated by the blade rotation arrows A and B in FIG. 1. Normally, this would leave an uncut strip of grass between the two blades. To prevent this, a small trimming blade 12 is located forwardly of the two cutting blades 6 along the midpoint of the deck to cut the grass that would normally have been left untouched by blades 6. This arrangement of cutting blades 6 and trimming blade 12 is known in prior art mowers. Blades 6 are supported on deck 4 and are driven in any suitable manner as is well known in the art.

In mowers of the type as known in the prior art, blades 6 were typically contained in the unconfined space of mower deck 4 bounded by side walls 10 and by top wall 8. A grass discharge chute or opening was usually provided in the side walls 10 for allowing the grass clippings to be discharged from deck 4. And, deck 4 often included some arcuate baffles on the front of the deck adjacent the path of blade rotation for preventing grass buildup in the front corners of deck 4 as the discharge was usually to the rear or the side. Otherwise, the interior space of deck 4 was often unobstructed.

Referring now to FIG. 1, cutting deck 4 of the present invention is particularly designed to function as a mulcher. Each cutting blade 6 is enclosed within a separate circular shroud 14 fixed to the underside of mower deck 4 in any suitable manner. Shroud 14 terminates in a lower edge 16 that extends slightly beneath side walls 10 of deck 4. See FIG. 2. Moreover, shroud 14 has a fairly constant depth except for a front cutout 18 that extends approximately 110° along the front part of shroud 14 as indicated by the arc segment C in FIG. 1. Referring again to FIG. 2, blade 6 has a cutting edge 20 which is slightly above the lower edge 16 of shroud 14 except in the area of front cutout 18 where the cutting edge 20 is exposed to uncut grass. Blade 6 includes the usual upwardly extending sails (not shown) for generating a circumferential air flow for transporting grass clippings. The sail tips rotate in a plane indicated at 22 that is located within the confines of shroud 14 over its entire length including front cutout 18.

Each of the cutting chambers defined by one of the shrouds 14 includes means for deflecting the grass clippings downwardly and generally inwardly. This deflecting means comprises four triangular deflectors or kickers 24a–d spaced circumferentially around the shroud with the angular spacing noted in FIG. 1. Each kicker 24 is identically shaped and includes a triangular upstream front face 26 and downstream rear face 27 taken with respect to the direction of rotation of blade 6. Front face 26 is shaped and positioned to intercept and deflect grass clippings inwardly and downwardly. The triangular front face 26 of kicker 24 is truncated at its lowermost point, as shown at 28, to increase the surface area of that face keeping in mind the need to maintain suitable clearance with cutting blade 6. Referring to FIG. 2, kicker 24 is spaced above the plane 22 of the sail tips a suitable distance, e.g. 0.625 inches.

Kickers 24 desirably extend radially inwardly from shroud 14 to terminate at or closely adjacent a concentric inner ring 30 fixed to the underside of deck 4 above cutting blade 6. Ring 30 converts the cutting chamber formed by shroud 14 into an annular, doughnut shape. This somewhat enhances mulching performance, but ring 30 can be dispensed with if desired. Kickers 24 are themselves fixed to the underside of deck 4 in any suitable manner, e.g. by welding or bolting kickers 24 to deck 4.

As shown in FIG. 1, kickers 24a–d are respectively located in one of the four quadrants of blade rotation which quadrants are also labeled a–d in FIG. 1. Cutting of the grass typically takes place in the first two quadrants a and b with transport of the grass clippings occurring primarily in quadrants c and d. The first three kickers 24a–c are located slightly rearwardly of the beginning of their respective quadrants a–c. The fourth kicker 24d is located approximately at the beginning of the fourth quadrant d. This kicker arrangement has been found to be particularly effective as will be described in more detail hereafter.

A guide means is provided for conducting the grass clippings cut by the front trimming blade 12 into the shrouded cutting chambers of cutting blades 6. Referring to FIGS. 1 and 3, this guide means comprises two ramps 32 secured to the underside of cutting deck 4 on either side of trimming blade 12 between shrouds 14 and a front side wall 10 of deck 4. Ramps 32 extend downwardly relative to cutting deck 4 to terminate in a discharge end 34 located at the same vertical elevation as the edge of front cutout 18. Thus, as the front trimming blade 12 cuts grass, the clippings will be guided by ramps 32 through the front cutouts 18 of shrouds 14 into the cutting chambers. A rear wall or baffle 36 extends between cutouts 18 on the adjacent shrouds 14 to prevent any grass clippings from front trimming blade 12 from passing rearwardly between the shrouds.

Applicants have found that a cutting deck 4 constructed as shown in FIGS. 1-3 functions very well as a mulching mower. As deck 4 is moved over the ground, uncut grass will come in contact with blades 6 in the first two quadrants a and b, and particularly over the length of front cutout 18 where the cutting edge of blade 6 is exposed, and be severed thereby. The grass clippings will however be recirculated inside shrouds 14 until they are eventually driven downwardly into the grass by the action of the blade and kickers 24. Thus, cutting deck 4 can be used to cut large areas of grass and yet hide and dispose of the clippings in the cut grass path. The cut grass path in this context means the grass left standing by the mower and not the uncut grass in advance of the mower's path of travel. It is this cut grass path into which the cut grass particles are driven. The advantages of mulching, previously known only for small walk behind mowers, have now been effectively extended by Applicants' invention to a large cutting deck.

Cutting deck 4 can be provided in various widths. As shown herein, blades 6 desirably have a 23 inch diameter. Thus, mower 2 has an overall 48 inch cutting width keeping in mind that blades 6 are slightly spaced from one another with trimming blade 12 being used to sever grass between them. However, other blade diameters could be used, along with the use of more than just two cutting blades 6.

The placement of kickers 24 relative to one another in the adjacent shrouds 14 appears to be related to the performance of cutting deck 4. In FIG. 4, an orientation of kickers 24 is shown which is different from that in FIG. 1. While the structure of FIG. 4 falls within Applicants' invention and is intended to be covered hereby, this structure did not yield results as satisfactory as the placement of kickers 24 in FIG. 1.

By comparing FIGS. 1 and 4, one can see that the kicker placement in the shrouds is identical in terms of the number of kickers and the angular distance between kickers, but kickers 24 as a whole were rotated approximately 45° in the direction of blade rotation in each of the shrouds from FIG. 1 to FIG. 4. In the FIG. 4 orientation, kicker 24d in the fourth quadrant d was approximately in the middle of that quadrant and thus was somewhat opposed to the same kicker 24d in the other shroud 14. In addition, kickers 24 in FIG. 4 were somewhat shorter than kickers 24 in FIG. 1.

When the cutting deck shown in FIG. 4 was tested, it did function as a mulcher deck to hide grass clippings. However, this deck did not hide the grass clippings as well in the strip between shrouds 14, i.e. clippings could generally be seen lying on top of the cut grass path in a strip coinciding with the area between shrouds 14. When Applicants rotationally shifted the kicker orientations from that shown in FIG. 4 to that in FIG. 1, i.e., by rearwardly rotating the arrangement of four kickers 24a-d approximately 45° in each shroud 14, this strip of grass clippings disappeared, thus indicating that the clippings were being more fully discharged down into the grass by deck 2. It is not understood precisely why this change resulted in improved performance, but it is believed to have something to do with the placement of kickers 24 in the fourth quadrant at opposed locations relative to one another as shown in FIG. 4 and the opening up of this distance in the orientation shown in FIG. 1.

Figure 5:
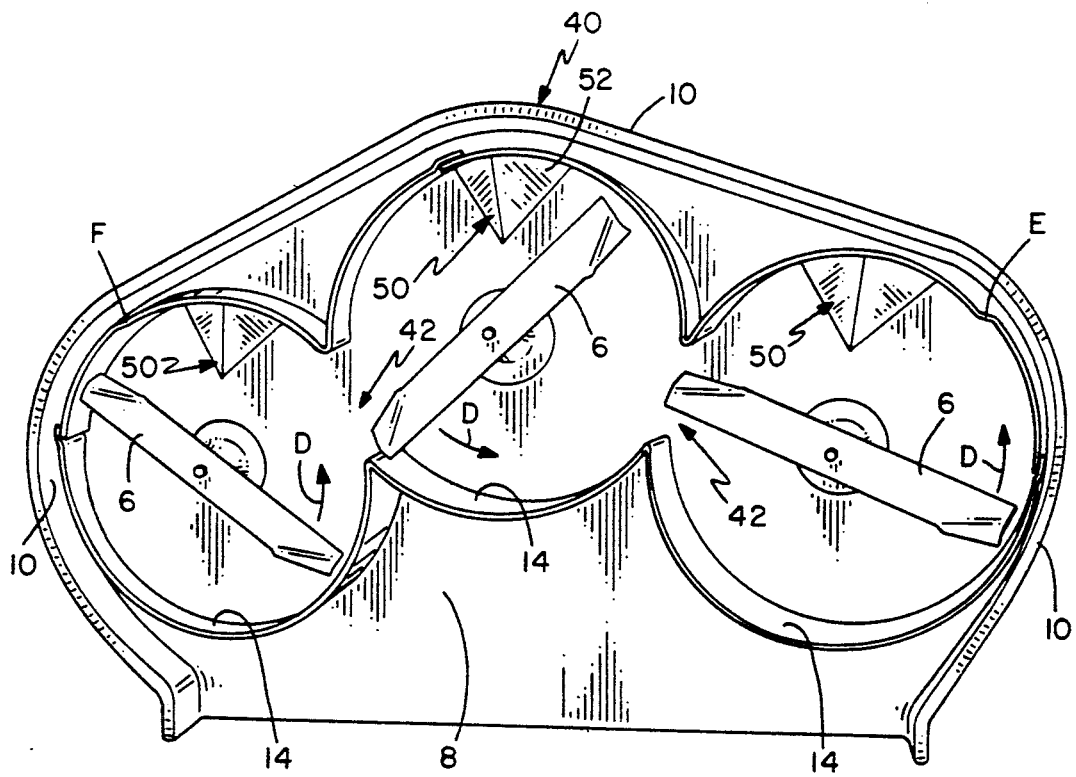
FIG. 5 is a bottom plan view of another embodiment of a cutting deck according to this invention, particularly illustrating another arrangement of cutting blades, shroud means, and grass deflecting means used for mulching.

Another embodiment of a cutting deck according to this invention is shown in FIGS. 5-7 as 40. To the extent that cutting deck 40 uses elements which correspond to elements described for cutting deck 4, the same reference numerals will be used to refer to such elements in cutting deck 40. Only the differences in the elements will be specifically described.

Again, cutting deck 40 carries and supports a plurality of cutting blades 6, this time shown as three blades 6, which now rotate in the same direction as shown by the arrows D in FIG. 5. Blades 6 are staggered front to back to overlap and obviate the need for a separate smaller trimming blade 12. Again, a shroud 14 is placed around each of cutting blades 6 to define a circular cutting chamber. However, the circular shrouds 14 are opened up at their junctures as shown at 42, i.e. where the middle shroud 14 touches each of the two side shrouds 14, so that there is some communication between the various cutting chambers. However, shrouds 14 taken collectively form a single shroud means enclosing all of the cutting blades 6 within deck 4.

Again, a deflector or kicker 50 is used in each of the cutting chambers to help assist in driving the grass clippings downwardly into the cut grass path. Instead of a plurality of angularly spaced kickers 24 as in the previous embodiment, only a single relatively larger kicker 50 is used in each of the cutting chambers at approximately the beginning of the second quadrant, i.e., at the forwardmost portion of the cutting chamber. Again, kicker 50 is triangularly shaped having an upstream face 52 which deflects clippings inwardly and downwardly in each shroud 14.

The depth of the shroud means enclosing blades 6 is not constant. Referring to FIGS. 5 and 6, the shroud means has a normal depth D1 which will extend to a point slightly below the level of the cutting edge 20 of blade 6 to enclose blade 6 and thereby confine the grass clippings. However, the front face of the shroud means includes a cutout 18 that extends over the entire length of the shroud means from a first point D located at the beginning of the outermost side of one of the side shrouds 14 to a second point E located at the beginning of the outermost side of the other side shroud 14. See FIG. 5. This cutout 18, like the cutout 18 in the embodiment of FIGS. 1-3, has a lower edge located above the blade cutting edge 20 so that cutting edge 20 is exposed over the length of cutout 18. This allows uncut grass to be more easily cut.

A cutting deck 40 built in accordance with FIGS. 5-7 has been found to effectively mulch grass. The reduced height of front cutout 18 of the shroud means allows uncut grass particles to easily reach cutting blades 6. The increased height of the remaining portions of the shroud means acts to confine the cut grass particles and keep them from escaping out past the sides of the shroud. Some of the clippings will escape past the rear of the shroud, but too few to pose a problem to proper mulching. The grass clippings recirculating inside the shroud means will eventually be driven inwardly for recutting and downwardly into the cut grass path by the cooperation of the blades 6 and kickers 50.

A third embodiment of a cutting deck according to this invention is illustrated in FIGS. 8 and 9 as 60. Again, to the extent that cutting deck 60 uses elements which correspond to elements described for cutting deck 4, the same reference numerals will be used to refer to such elements in cutting deck 60.

While the cutting decks 4 and 40 previously described herein have functioned fairly well as mulchers in some grass conditions, these decks have exhibited poorer performance when the grass is tall or wet. The decks 4 and 40 do not always completely hide the grass clippings in the cut grass path in these grass conditions. Cutting deck 60 has provided the best performance of all three decks in all grass conditions including tall and wet grass. Use of cutting deck 60 is, therefore, currently preferred.

Cutting deck 60 has three shrouded cutting chambers 62, 64 and 66 which extend downwardly from the top wall 8 of deck 60. Each cutting blade 6 is enclosed within one of the shrouds 62, 64 and 66. Blades 6 are mounted for rotation within the shrouds in the same direction as shown by the arrows E in FIG. 8. Preferably, blades 6 are driven in a non-timed fashion using a conventional belt drive system as is well known in multi-bladed cutting decks.

Each shrouded chamber 62, 64 and 66 terminates in a lower edge 16 located below the plane of rotation of blade 6 so that blade 6 is generally completely enclosed within the shroud. Preferably, each cutting chamber is slightly obround to the front. This means that each chamber is not perfectly circular, but is stretched or elongated over the front hemisphere of the chamber so that the blade tip is spaced further away from the front wall of the chamber than from the rear wall. This stretched circular shape is known as an obround shape.

The degree of obroundness used in shrouded chambers 62, 64 and 66 may be varied. For that matter, the cutting chambers 62, 64 and 66 could even be circular. However, it has been found that a slightly, obround cutting chamber works somewhat better as a mulcher than one where the chamber is circular. In cutting deck 60, each blade tip is spaced from the rear shroud wall by 0.15 inches at the midpoint of the rear hemisphere and from the front shroud wall by 1.15 inches at the midpoint of the front hemisphere. The chamber reverts from its obround to circular shape gradually over the front hemisphere thereof with the rear hemisphere being circular relative to the orbit of blade 6.

As can be easily seen in FIG. 8, the chambers 62, 64 and 66 are longitudinally staggered with the front chamber 64 placed somewhat forwardly of the two side chambers 62 and 66. In addition, the cutting chambers are transversely overlapped with one another so that the orbits of the blade tips overlap a small amount, e.g. one and one half inches of blade overlap. This leaves no uncut grass strips between the respective cutting chambers. Such blade placement is conventional in multi-blade cutting decks.

The shrouds 62, 64 and 66 defining the cutting chambers are substantially enclosed so that the grass clippings contained in each chamber, cut by the blade 6 located within that chamber, remain in that chamber and are not transferred to any of the other cutting chambers until the clippings are driven downwardly into the cut grass path. Thus, the wall comprising each shroud 62, 64 and 66 is substantially solid and unbroken over its entire circumference with one exception, i.e. where adjacent chambers abut. In those areas, identified by arc segments F in FIG. 8, a small cutout or window 68 is provided extending upwardly from the lower edge 16 of the shroud wall to a spot located closely above blade 6. In effect, the chambers 62, 64 and 66 have no shroud walls in arc segments F at the level of blades 6.

The purpose of the windows 68 in shrouds 62, 64 and 66 is to allow the blade tips to come very close to one another, i.e. within a quarter inch or so. This would not have been possible if each chamber wall had been continued into the area of window 68 since the thickness of the walls would themselves have taken up considerable space, thus requiring the blade tips to be spaced further apart for clearance from the wall. But, by providing the aforementioned windows 68 in the arc segments F, the blade tip orbits can be brought very closely together.

Like decks 4 and 40, each chamber 62, 64 and 66 includes means located above the path of blade rotation for deflecting the grass particles inwardly and eventually downwardly. The deflecting means comprises four triangular kickers 24a-d located approximately 90° apart around the circumference of each chamber 62, 64 and 66, thus corresponding in number to the number of kickers 24 used inside each shroud of deck 4. Preferably, kickers 24 are located in the chambers so that no kickers 24 in adjacent chambers are located directly opposite to one another. For example, kicker 24a in chamber 62 is spaced apart from kicker 24c in the chamber 64 by approximately the amount by which central chamber 64 is staggered forwardly from side chambers 62 and 66, which corresponds approximately to the length of window 68.

Each kicker 24 is shaped generally similarly to kickers 24 used in deck 4, though they are somewhat shorter and do not have the lower truncated face 28. Nonetheless, each kicker 24 includes a triangular upstream front face 26 and downstream rear face 27 taken with respect to the direction of rotation of blade 6. Front face 26 is shaped and positioned to intercept and deflect grass clippings inwardly and downwardly. Thus, grass clippings travelling around a chamber 62, 64 or 66 above the plane of rotation of blade 6 after being cut by the blade 6 will eventually impact against such face 26 and be deflected inwardly and/or downwardly. Thus, the enclosed nature of chambers 62, 64 and 66 allows the grass clippings to be recirculated until they are cut finely enough to be driven downwardly into the grass by the coaction of blades 6 and kickers 24. The windows 68 in the chambers have little or no effect on the disposal of the grass clippings, i.e. the grass clippings do not travel from one chamber 62, 64 or 66 to the next, because the window 68 terminates slightly above the plane of blade 6. Thus, each chamber 62, 64 and 66 over its circumference presents an unbroken face to the grass clippings as they travel in a circular fashion above blade 6.

An additional feature of cutting deck 60 is the use of a horizontal front shield or ledge 70 designed to eliminate "streaking" between the chambers. Applicants have found that mulcher decks which use multiple, side-by-side cutting chambers will sometimes leave "streaks" of grass at the intersections or junctions of the chambers. The streaks actually comprise a line of grass which is cut to an uneven and slightly longer length than the rest of the grass, leaving a streak of grass which is visible after mowing. This streaking can occur even when the grass clippings have otherwise been properly hidden in the grass by having been driven downwardly into the grass. Such streaking is undesirable as the streaks mar the appearance of the cut grass path.

Applicants believe they have discovered why such streaking occurs in a cutting deck like deck 60. As the cutting deck is propelled forwardly over the ground, it will move over blades of uncut grass. Once this uncut grass passes into one of the cutting chambers, the airflow and lift developed by the rotation of cutting blades 6 will stand the grass up and cut it off. However, the grass which is located at the junctions between the cutting chambers, referred to by the numerals 72 in FIG. 8, is bent in a random fashion to one side or the other before it enters one cutting chamber or the other. Because this grass is bent transversely right before it is elevated, it has a slightly longer cut length after it is severed than the grass which enters the cutting chamber in a more central chamber location. This slightly longer length gives rise to the "streaks" of grass which are left.

One might ask whether or not such streaks are typically left by the usual side walls 10 of a cutting deck, i.e. at the very sides of the deck. The answer is yes, but the operator can compensate for this by slightly overlapping each successive path of the mower as he traverses the area being cut. In other words, the operator on the next pass simply positions the cutting deck to recut any side streak left by the deck. However, when a mulcher deck 60 leaves a number of grass streaks along the junctions 72 between interior cutting chambers, there is no efficient way to overlap the mower passes to get rid of these streaks without, in effect, cutting the same area a number of times. This is obviously undesirable and a waste of labor.

Applicants have found an effective solution for getting rid of the streaks normally left between the cutting chambers. That solution is the front ledge 70 which bridges the junctions 72 between cutting chambers and extends out to the side walls 10 of deck 60. Ledge 70 includes a planar lower face 74 located at the same vertical elevation as the lower edge 16 of the cutting chamber shrouds to remove the discontinuity formed by the junctions. Desirably, planar lower face 74 extends from the junctions 72 between the cutting chambers all the way out to each side wall 10 of cutting deck 60. Thus, flat planar surfaces 74 are present on the bottom of cutting deck 60 in advance of the side cutting chambers 62 and 66 and spanning across the width of the junctions 72 between the side chambers and the central chamber.

It has been found that ledges 70 deflect the incoming uncut grass forwardly rather than side-to-side, over the entire width of the deck, including at the junctions 72 between the cutting chambers and also along the side walls 10 of the deck. This action is enhanced by having the leading edge of front ledge 70 be formed by a straight vertical wall 76 and to use an inclined transition wall 78 extending between the leading edge 76 and bottom face 74 of ledge 70. Thus, the grass encountered by the mower is bent straight forwardly by the front edge 76 and inclined wall 78 and is retained in that forwardly bent position by bottom face 74 until the grass suddenly reaches the interior of the cutting chamber 62, 64 or 66. The grass is then lifted vertically by the airflow imposed by the blade without first having been bent side-to side. Thus, the grass is cut to a uniform height eliminating the streaking, both at the junctions 72 between the chambers and along the side walls 10 of the deck. While it is most important to use the ledges 70 at the junctions between adjacent chambers, extending such ledges 70 to the side walls 70 eliminates the side streaks and increases the effective cutting width of the deck.

Cutting deck 60 as shown in FIGS. 8 and 9 does an excellent job of mulching grass and is able to hide the cut grass clippings in the cut grass path even when the grass is tall and/or wet. In addition, there are no streaks of grass left in the cut grass path after mowing is concluded. Accordingly, the grass has a neat and freshly mown appearance with the clippings having been conveniently deposited in the cut grass path for mulching purposes. Since the clippings need not be picked up or otherwise disposed of, less work is required of the operator and the cutting deck is ecologically more efficient.

Cutting deck 60 as illustrated herein has a 48 inch cutting width using 17 inch blades in the cutting chambers. However, the principles of the invention may be applied to other sizes of cutting decks, either larger or smaller. For example, cutting deck 60 could have a 60 inch cutting width using three 21 inch blades. For such a 60 inch deck, more than four kickers 24 would probably be required in each cutting chamber to achieve good mulching results. Thus, the number of kickers used in each chamber can obviously be varied.

Various modifications of this invention will be apparent to those skilled in the art. Thus, the scope of the invention is to be limited only by the appended claims.

We claim:

1. A multi-bladed mulching mower, which comprises:
   (a) a cutting deck which may be operatively connected to a traction unit for moving the cutting deck over the ground, the cutting deck having an underside facing the ground;
   (b) a plurality of substantially horizontal cutting blades rotatably carried beneath the cutting deck spaced below the underside of the deck;
   (c) shroud means extending downwardly from the deck, wherein the blades are located within the shroud means and the shroud means is shaped to confine the circulation of the grass clippings to areas of the cutting deck adjacent the cutting blades; and
   (d) deflecting means above the cutting blades and within the shroud means to deflect grass clippings downwardly into the path of the blade for eventual disposal in the cut grass path.

2. An improved mulching mower as recited in claim 1, wherein the shroud means comprises an individual shroud located around each cutting blade.

3. An improved mulching mower as recited in claim 2, wherein the shrouds are located side-by-side across the deck in a non-overlapping manner in which adjacent shrouds are spaced from one another.

4. An improved mulching mower as recited in claim 2, wherein the shrouds are located side-by-side across the deck in an overlapping manner in which adjacent shrouds have contacting portions, wherein the contacting portions are removed.

5. An improved mulching mower of the type having a cutting deck attached to a traction unit for movement over the ground, wherein the cutting deck includes a plurality of cutting blades rotatably supported beneath the deck in a side-by-side manner, wherein each of the cutting blades has a cutting edge which rotates successively through four quadrants beginning with first and second front quadrants and continuing successively through third and fourth rear quadrants; wherein the improvement relates to the cutting deck and comprises:
   (a) a plurality of shrouds extending downwardly from the cutting deck, wherein each cutting blade is located inside one of the shrouds; and
   (b) at least one kicker mounted inside each shroud for deflecting cut grass particles downwardly.

6. An improved mulching mower as recited in claim 5, wherein a plurality of kickers are mounted inside each shroud for deflecting cut grass particles downwardly.

7. An improved mulching mower as recited in claim 6, wherein the kickers located in each shroud are spaced circumferentially apart in the direction of blade rotation.

8. An improved mulching mower as recited in claim 7, wherein at least one kicker is located in each of the four quadrants of blade rotation.

9. An improved mulching mower as recited in claim 8, wherein the kicker located in the fourth quadrant is located approximately at the beginning of the fourth quadrant.

10. An improved mulching mower as recited in claim 5, wherein adjacent blades are spaced apart by a small gap, and further including a front trimming blade contained beneath the deck in advance of the gap between adjacent blades to cut grass in the gap, and further including guide means for conducting any grass cut by the cutting blades into the shrouds of the adjacent cutting blades.

11. An improved mulching mower as recited in claim 10, wherein the guide means comprises ramps secured to the cutting deck on either side of the trimming blade for guiding grass clippings into a cutout portion of the shrouds.

12. An improved mulching mower as recited in claim 11, wherein the cutout portion of the shrouds has a lower edge located above a cutting edge of the blades.

13. An improved mulching mower as recited in claim 11, wherein the cutout portion extends over a portion of the first and second quadrants.

14. A multi-bladed mulching mower, which comprises:
(a) a cutting deck having an underside which faces the ground, wherein the cutting deck is movable over the ground;
(b) multiple cutting blades rotatably carried on the deck and spaced beneath the underside of the deck and above the ground, wherein the cutting blades rotate in generally horizontal cutting planes to sever grass or other vegetation as the cutting deck is moved over the ground;
(c) shroud means extending downwardly from the underside of the cutting deck for forming a cutting chamber around each of the cutting blades, wherein each cutting chamber is substantially enclosed except for an open lower face thereof so that grass cut by that cutting blade is confined within the cutting chamber and is circulated in a circumferential path within the cutting chamber by the operation of the cutting blade until the grass clippings are dispersed downwardly through the open lower face of the cutting chamber; and
(d) at least one grass deflecting member located in each cutting chamber above the plane of rotation of the blade, wherein the grass deflecting member includes a deflecting surface which is located in a position relative to the circumferential flow of grass clippings in the cutting chamber to intercept the grass clippings and aid in their disposal downwardly from the cutting chamber.

15. A mulching mower as recited in claim 14, wherein the deflecting surface of the deflecting member extends vertically downwardly from the underside of the cutting deck to a lowermost point located above the plane of the cutting blade, and wherein the deflecting surface of the deflecting member further extends radially inwardly from the shroud means to an innermost point located inwardly from an outer tip of the cutting blade such that the deflecting surface overlies a radially outer portion of the cutting blade.

16. A mulching mower as recited in claim 15, wherein a plurality of deflecting members are mounted inside each cutting chamber with the deflecting members being spaced circumferentially apart in the cutting chamber.

17. A multi-bladed mower as recited in claim 16, wherein the deflecting surface of the deflecting member is angled relative to a vertical, radial plane extending through the deflecting surface to deflect the grass clippings both downwardly and inwardly relative to the cutting chamber.

18. A mulching mower as recited in claim 14, wherein the cutting chambers are arranged side-by-side across the cutting deck.

19. A mulching mower as recited in claim 18, wherein adjacent cutting chambers are overlapped a sufficient amount so that the paths of the cutting blades contained therein transversely overlap to leave no uncut grass strips between adjacent cutting chambers.

20. A mulching mower as recited in claim 19, wherein the cutting chambers include a central cutting chamber which is spaced forwardly of two side cutting chambers arranged on either side of the central cutting chamber, and wherein the central cutting chamber is spaced sufficiently in front of the two side cutting chambers such that the blade paths do not interfere with one another.

21. A mulching mower as recited it claim 20, wherein the side and central cutting chambers are formed by separate shroud walls which abut with one another over a predetermined distance at the intersection between the side and central cutting chambers, and wherein the shroud walls are cut away from a lower edge thereof to a height slightly above the plane of the cutting blades over the distance of the intersection between the shroud walls to allow closer spacing of the blades contained in the side and central cutting chambers.

22. A mulching mower as recited in claim 18, wherein the shroud means defining the cutting chambers includes a front shroud wall for each cutting chamber with the front shroud walls of adjacent cutting chambers abutting one another to form a junction therebetween, and further including means located in front of the junctions between adjacent cutting chambers for bending the grass approaching the cutting chamber junctions forwardly before the grass enters the cutting chambers.

23. A mulching mower as recited in claim 22, wherein the grass bending means comprises a front ledge extending between the front shroud walls of adjacent chambers at the junction therebetween.

24. A multi-bladed mower as recited in claim 23, wherein the front ledge has a relatively planar lower face located approximately at the same vertical elevation as a lower edge of each front shroud wall of adjacent cutting chambers.

25. A mulching mower as recited in claim 24, wherein the cutting chambers are arranged side-by-side across the cutting deck, wherein adjacent cutting chambers are overlapped a sufficient amount so that the paths of the cutting blades contained therein transversely overlap to leave no uncut grass strips between adjacent cutting chambers, and wherein adjacent cutting chambers are longitudinally staggered fore-and-aft relative to one another such that the blade paths do not interfere with one another.

26. A multi-bladed mower as recited in claim 25, wherein the front ledge extends outwardly from the junctions between adjacent cutting chambers to each side of the cutting deck.

27. A multi-bladed mower, which comprises:
(a) a cutting deck which is suited to be moved over the ground, the cutting deck having a plurality of rotary cutting blades suspended beneath the cutting deck and located above the ground with the cutting blades arranged to rotate in generally horizontal cutting planes;
(b) a plurality of shroud walls extending downwardly from the cutting deck and enclosing the cutting blades over at least the forward portions of their rotation, the shroud walls terminating in a lower edge spaced above the ground, and wherein adjacent shroud walls contact one another to form a junction at the intersection of adjacent shroud walls; and
(c) a baffle located at the junction between adjacent shroud walls and extending forwardly therefrom, the baffle being located approximately at the same level as the lower edge of the shroud walls.

28. A multi-bladed mower, which comprises:

(a) a cutting deck which is suited to be moved over the ground, the cutting deck having opposed sides and a plurality of rotary cutting blades suspended beneath the cutting deck to rotate in generally horizontal cutting planes;

(b) shroud means extending downwardly from the underside of the cutting deck for forming a cutting chamber around each of the cutting blades, wherein adjacent cutting chambers are arranged side-by-side relative to one another across the cutting deck; and (c) a horizontal front ledge which extends between adjacent cutting chambers and extends forwardly from the cutting chambers in advance of the cutting chambers.

29. A multi-bladed mower as recited in claim 28, wherein adjacent cutting chambers abut one another to form junctions therebetween located interiorly of the sides of the cutting deck, and wherein the front ledge includes a substantially planar lower face located at the same vertical elevation as a lower edge of each adjacent cutting chamber immediately proximate to the junction between adjacent cutting chambers.

30. A multi-bladed mower as recited in claim 28, wherein the front ledge further includes:

(a) a leading edge formed by a generally straight vertical wall; and (b) an inclined transition wall extending between the leading edge and the lower face of the ledge.

31. A multi-bladed mower as recited in claim 30, wherein the front ledge extends outwardly from the interior junctions between adjacent cutting chambers to each side of the cutting deck.

32. A multi-bladed mower, which comprises:

(a) a cutting deck which is suited to be moved over the ground, the cutting deck having opposed sides and a plurality of rotary cutting blades suspended beneath the cutting deck to rotate in generally horizontal cutting planes;

(b) shroud means extending downwardly from the underside of the cutting deck for forming a cutting chamber around each of the cutting blades, wherein the cutting chambers include a central cutting chamber which is spaced forwardly of two side cutting chambers arranged on either side of the central cutting chambers, wehrein the side and central cutting chambers are overlapped a sufficient amount so that the paths of the cutting blades contained therein transversely overlap to leave no uncut grass strips between the side and central chambers, and wherein each side cutting chamber has an interior junction with the central cutting chamber where the side cutting chamber abuts with the central cutting chamber, said side cutting chamber extending from such junction out toward the sides of the deck; and (c) a horizontal baffle extending between each side cutting chamber and the central cutting chamber at the junction therebetween and extending forwardly therefrom, the baffle being located approximately at the same level as a lower edge of the cutting chambers adjacent to the junction to bridge the space between the cutting chambers immediately in advance of the junction.

33. A multi-bladed mower as recited in claim 32, wherein the baffle extends out in front of each side cutting chamber over its entire width.

34. A multi-bladed mower as recited in claim 33, wherein each side cutting chamber extends to the side of the deck.

35. A multi-bladed mower as recited in claim 33, wherein each baffle is formed by a lower face of a front ledge, and wherein the front ledge further comprises:

(a) a leading edge formed by a generally straight vertical wall; and (b) an inclined transition wall extending between the leading edge and the lower face of the ledge.

36. A multi-bladed mower as recited in claim 32, wherein each cutting chamber is substantially enclosed except for an open lower face thereof so that grass cut by that cutting blade is confined within the cutting chamber and is circulated in a circumferential path within the cutting chamber by the operation of the cutting blade until the grass clippings are dispersed downwardly through the open lower face of the cutting chamber, and further including at least one grass deflecting member located in each cutting chamber above the plane of rotation of the blade, wherein the grass deflecting member includes a deflecting surface which is located in a position relative to the circumferential flow of grass clippings in the cutting chamber to intercept the grass clippings and aid in their dispersal downwardly from the cutting chamber.

* * * * *